(12) United States Patent
Zuse

(10) Patent No.: US 6,735,577 B2
(45) Date of Patent: May 11, 2004

(54) METHOD AND APPARATUS FOR AUTOMATIC SEARCH FOR RELEVANT PICTURE DATA SETS

(75) Inventor: Horst Zuse, Berlin (DE)

(73) Assignee: Dr.-Ing. Horst Zuse, Berlin (DE)

( * ) Notice: Subject to any disclaimer, the term of this patent is extended or adjusted under 35 U.S.C. 154(b) by 299 days.

(21) Appl. No.: 09/898,755

(22) Filed: Jul. 2, 2001

(65) Prior Publication Data

US 2002/0103782 A1 Aug. 1, 2002

(30) Foreign Application Priority Data

Jul. 3, 2000 (DE) ......................................... 100 32 225

(51) Int. Cl.$^7$ ............................................. G06F 15/18
(52) U.S. Cl. ......................................................... 706/12
(58) Field of Search ............................................ 706/12

(56) References Cited

U.S. PATENT DOCUMENTS 4,821,333 A * 4/1989 Gillies .......................... 382/308
5,983,237 A   11/1999 Jain et al. ......................... 707/3
6,233,570 B1 * 5/2001 Horvitz et al. .................. 706/12

OTHER PUBLICATIONS

Cortes, et al., "Support Vector Networks", Machine Learning 20.273.297 (1995), pp. 273–297.
Herbrich, et al., "Bayes Point Machines: Estimating the Bayes Point in Kernel Space", not dated.
Graepel, et al., "Classification on proximity Data with LP–Machine", not dated, pp 1–6.
Gerald Salton, *Automatic Information Organization and Retrieval*, pp. 235–279, 1965.
Frank Rosenblatt, *Principles of Neurodynamics*, pp. 97–127, 1962.
Grace Wahba, *Spline Models for Observational Data*, pp. 1–169, 1990.

* cited by examiner

*Primary Examiner*—George B. Davis
(74) *Attorney, Agent, or Firm*—Knobbe Martens Olson & Bear LLP

(57) ABSTRACT

An apparatus is configured to automatically search for relevant picture data sets from a quantity of n (n≧2) picture data sets electronically stored in a memory device. Picture attributes for each of the n picture data sets is stored electronically in the memory device, and the n picture data sets as well as the stored picture attributes are adapted to be processed electronically by processor device. A training quantity including the electronically stored picture attributes of picture data sets which were selected by a user is utilized in the context of a machine learning process carried out automatically with the aid of the processor device to determine a decision function f. Subsequently, system relevancies of the picture data sets are calculated, based on the decision function f. Selected picture data sets then are provided in the context of the search result to be output in response to the respective system relevance.

11 Claims, 2 Drawing Sheets

METHOD AND APPARATUS FOR AUTOMATIC SEARCH FOR RELEVANT PICTURE DATA SETS

FIELD OF THE INVENTION

The instant invention relates to information search and retrieval tasks, especially to finding electronically stored images in electronic data bases.

BACKGROUND OF THE INVENTION

In these days of the internet with the bulk of information vastly and rapidly growing in the shortest time span, an ever increasing demand exists for purposive and effective search and retrieval of information held in store in data bases. The problems involved in so-called information retrieval of data which are stored electronically in data bases may be outlined as follows: A given data base comprises n data sets $x_1 \ldots x_n$ ($n \geq 2$). The search for pictures and retrieval thereof is carried out by a special method of searching in data bases. The object of the search are data sets $x_1 \ldots x_n$ which embody n pictures in electronic form. What must be found in the data base is a subset $D_{rel}$ of relevant data sets (electronic images). This subset $D_{rel}$ is the relevant quantity of data sets to answer a specific question by a user. In an example of searching for a picture this might be pictures of a beach at a coast of a Hawaiian island.

When applying known searching methods and device to retrieve pictures from data bases, first, attempts are made to describe the relevant subset $D_{rel}$ by catchwords, subsequently the catchwords are drawn upon to make a search request. The user of the data base presents his request in textual form—usually without having knowledge of the full list of catchwords listed in the data base. In the example chosen, the user's query might include the words "beach Hawaii". The words of this query are compared with catchwords which are stored for the pictures in the data base. Often in these cases the so-called Boolean search method is applied. This method offers the user the opportunity to link the catchwords by AND, OR, and NOT. Some methods and device additionally permit these three operations to be given a respective weighting.

The following difficulties may have to be overcome when searching in a picture data base:

(1) How can the subset $D_{rel}$ needed for the search be described systematically with words when the data sets are $x_i$ (digitized) images?

(2) The data base often comprises a very large number of pictures (n>>100,000) and, therefore, the user cannot review and judge all those n pictures.

Fundamentally, a distinction may be made between two different approaches in the search for pictures. In one case the picture is digitized and features are extracted from the digitized image. That begins with the simplest description, using gray levels or color levels of each pixel (so-called low level features), i.e., for a picture having 1,000×1,000 pixels a total of 1,000,000 different features per picture are extracted. It ends with features referred to as high level features, such as the number of edges and corners or number of surfaces etc. The use of simple features has the advantage of permitting quick calculation. However, it is disadvantageous that such features are not very well suited to describe relevant search quantities of the picture. Although more complex features thus would be much better suited, their extraction at present still involves such great expenditure that it is almost impossible, for practical reasons, to make use of them in connection with data bases containing more than 10,000 pictures.

In another known method a human being provides catchwords to describe a picture, i.e., for each picture a list of catchwords is drawn up which refer to what is represented in the picture. This complex extraction of features has the advantage that it simplifies the characterization of relevant pictures by linking the catchwords. Technically speaking, a picture x is represented by a vector $x \in \{0, 1\}^s$ (s is the number of all the catchwords possible). If the ith catchword is contained in the list of catchwords pertaining to the picture the ith component $x_i$ of vector x is 1, otherwise it is 0. Operations, such as conjunction (AND) or disjunction (OR) in this case may be represented by mathematical operations, like multiplication or addition.

Once the search has been started, the picture search machine calculates a system relevance for each of the electronically stored picture data sets $x_1 \ldots x_n$ in respect of the search request. This calculation of the respective system relevance is an essential property of each picture search machine or picture search method. The effectiveness and quality of the calculation of the respective system relevance are of essential importance for the success of the search system. Two approaches, based on differing principles, have become generally accepted with catchword search methods for calculating the system relevance:

If the textual search request comprising only catchwords, as generated by the user, is interpreted as a vector $q \in \{0, 1\}^s$ the similarity between the textual search request and the respective catchword list of the pictures or picture data sets in the data base can be calculated, based on the lists of catchwords available for the electronically stored pictures. This similarity then may be used as a measure of system relevance. This approach, known as the "vector space model" is described, for instance, by G. Salton in "Automatic Information Organization and Retrieval", McGraw-Hill, New York, 1968.

With another approach, a probability model is applied to the catchwords in relevant documents (estimated on the basis of the textual search request which contains nothing but catchwords), allowing the probability to be calculated that a picture is comprised by the subset $D_{rel}$, and this probability then may be taken as the measure of system relevance.

On the basis of the system relevances found for all the pictures in the data base, the pictures are put into order in accordance with the system relevances calculated and thus are presented to the user. Many times in practice, it is sufficient to find just the 100 pictures having the highest values of system relevance—a task which can be resolved much more quickly than sorting a huge number of, for instance, 1,000,000 pictures.

If the user of the data base still should not be satisfied with the search result he will have to revert to his query and change the text, for example, by restricting it further. Some systems offer the user a possibility of "feedback" by way of choosing a picture which he thinks is "very similar" or "close" to the relevant documents $D_{rel}$.

Such methods have an essential disadvantage in that search queries based on identical text entries by the user in connection with a certain stock of pictures always will provide the same search result. This device that the users in search of a picture are the ones who must adapt to the catchword system of the data base in order to be able to model the individual preferences and characteristics of the data base because the only possible device of "communication" between the data base user and the search system is the textual search query. As a rule, that requires intensive and time consuming "exploration" of the specifics of the respective data base chosen by the data base user.

SUMMARY OF THE INVENTION

It is the object of the invention to provide an improved method and apparatus for searching for a relevant subset of data sets from a quantity of data sets, especially picture data sets which are stored electronically in a data base and, at the same time, to improve the efficiency and quality of the search as well as its user friendliness.

According to one aspect of the invention a method is provided of automatically searching for relevant picture data sets in a quantity of n ($n \geq 2$) picture data sets electronically stored in a memory device, picture attributes for each of the n picture data sets being stored electronically in the memory device, and the n picture data sets as well as the stored picture attributes being adapted to be processed electronically by a processor, said method comprising:

(a) providing a first selection of picture data sets from the n picture data sets with the aid of the processor to be output with the aid of a display device;

(b) outputting several of the picture data sets of the first selection of picture data sets with the aid of the display device;

(c) electronically recording a respective evaluation by a user for at least one relevant picture data set of the plurality of picture data sets output according to (b); and (d) providing a second selection of m ($m \leq n$) picture data sets from the n picture data sets in a sequence which depends on a respective system relevance of the m picture data sets to be output by the display device; a machine learning process being carried out for electronically determining a decision function f to provide the second selection of the m picture data sets; the picture attributes electronically stored in the memory device for the at least one relevant picture data set constituting a training quantity for the machine learning process; the respective system relevance being determined for k ($k \geq m$) picture data sets with the aid of the decision function f and the respective electronically stored picture attributes; and the k picture data sets comprising at least part of the m picture data sets of the second selection.

According to another aspect of the invention a picture search apparatus is provided, comprising:

a memory device for electronically storing n ($n \geq 2$) picture data sets and respective picture attributes each associated respectively with the n picture data sets;

a display device for outputting a first selection of picture data sets from the n picture data sets;

recording device for electronically recording a respective evaluation by a user for at least one relevant picture data set of the first selection of picture data sets output;

processor for automatically carrying out a machine learning process to determine a decision function f in consideration of the picture attributes stored electronically in the memory device for the at least one relevant picture data set and for electronically determining a respective system relevance for m ($m \leq n$) picture data sets of the n picture data sets stored electronically in the memory device with the aid of the decision function f and the respective electronically stored picture attributes; and device for providing a second selection of picture data sets in a sequence which depends on the respective system relevance to be output by the display device, the second selection of picture data sets comprising k ($k \geq m$) picture data sets of the m picture data sets.

The invention comprises the essential fundamental concept of making use of a subset of relevant pictures, or the corresponding picture data sets selected by the user of a picture search device, as a training quantity for a machine learning process of the picture search device. In the course of the electronically accomplished machine learning process the picture attributes associated with the pictures of the training quantity are processed electronically. In this electronic processing, mathematical operations are applied to go to relevant picture data sets in a data base, in accordance with a search query recorded, and make them available for further processing, especially for being output by way of a display.

The invention offers the substantial advantage of substituting the uncomfortable search requiring the input catchwords by a simple evaluation of search results, for example, by clicking mouse buttons. In this manner the user of the search system is relieved of the chore of having to describe the picture (digital features and/or catchwords), as in the prior art.

It is another advantage of the invention that the search system adapts itself to the user by way of the machine learning process, rather than the other way around where the user of the data base must learn the specific catchword system of the data base. While the known search system starts from the assumption that the picture search system operates (internally) with a search query q, this paradigm is replaced by the machine learning process of a decision function f. In practice, this device that no generally applicable measure of similarity must be found between a text inquiry q and pictures x.

The novel method may be used together with existing electronically stored descriptions of pictures and requires no expensive preprocessing of picture data bases. Moreover, the method is adapted to make use of digitized features (easy to be extracted) to optimize the adaptation of the system relevance to the user relevance (as expressed by the quantity $D_{rel}$ which is unknown to the system).

If the user of the novel search method or apparatus wishes to repeat the procedure he is free, after each output of search results, to decide once more in favor of relevant pictures, in other words he can make a new evaluation irrespective of the preceding one, an opportunity offered to support what is called "creative drifting". With reference to the example chosen, this device that a user who at first looked for pictures of Hawaiian beaches may decide otherwise in his renewed evaluation. If the user discovers an element which rather meets his desire, in the search result displayed, such as a beach in Australia he can designate pictures of Australian beaches as exclusively relevant. In this manner the original concept of a Hawaiian coast is ignored in the renewed evaluation.

In accordance with a convenient further development of the invention the first selection of picture data sets from among the n picture data sets is made by device of a catchword search whereby the novel method can be combined in very simple manner with known methods of catchword searching.

Another embodiment of the invention, preferred in terms of user friendliness, provides for the electronic recording of the respective evaluation by the user for the at least one relevant picture data set according to (c) to comprise the recording of an actuation of an electronic selector device, especially a mouse device which cooperates with the display device. Especially when using the mouse device, a method is realized which permits the user, when selecting picture data sets, to focus on the data sets displayed and thus make his choice in an easy way.

A preferred embodiment of the invention, especially devised to minimize electronic calculating expenditure and to accelerate processing, provides for the respective evaluation by the user for the at least one relevant picture data set according to (c) to be recorded electronically as a binary evaluation so that each picture data set evaluated may be recorded as a relevant picture data set and each picture data set not evaluated may be recorded as a non-relevant picture data set.

Minimizing of the processing time may be achieved by a convenient implementation of the method according to the invention by which the decision function f is determined in the context of the machine learning process, whereby the electronic determination of the respective system relevance is optimized in terms of the time period needed to achieve it.

The machine learning process can be carried out conveniently by device of a perceptron learning method.

A preferred embodiment of the invention permits the machine learning process to be carried out in combination with existing data bases because the picture attributes stored comprise catchwords suitable for electronic evaluation by the processor.

BRIEF DESCRIPTION OF THE DRAWINGS

Embodiments of the invention will be explained in greater detail below with reference to a drawing.

DETAILED DESCRIPTION OF THE INVENTION

A quantity D of pictures available for search is stored electronically in a data base in the form of n picture data sets $x_1 \ldots x_n$ ($n \geq 2$). In the description below it is assumed that the pictures have been subjected to catchword attribution, i.e., each picture has been assigned attributes expressed as catchwords which have been listed and stored. Each respective catchword list thus is memorized in the data base as a catchword vector ready to be searched electronically. However, any other characteristics of pictures may be utilized with the method according to the invention, provided they are adapted to be stored and processed electronically. For instance, digital features, gray values or chrominance levels, or color histograms may be used. Including color histograms, in particular would make it possible to take into account the atmosphere, mood, and style of the respective picture. Also the structure and shape of a picture may be exploited, for instance, by drawing upon features of a Wavelet analysis. The use of catchwords has the advantage of permitting an optional combination of the search system with traditional catchword search techniques. A combined inclusion of catchwords and one or more digital features likewise may be convenient to enhance the quality of the search results.

It should be noted in this context that the description of a picture is a decisive factor which determines the quality of the picture search system. Reasonable search results are not to be expected of any picture search system if the electronically stored picture attributes (catchword lists) of pictures or picture data sets have nothing in common with the actual contents of the picture.

Figure 1:
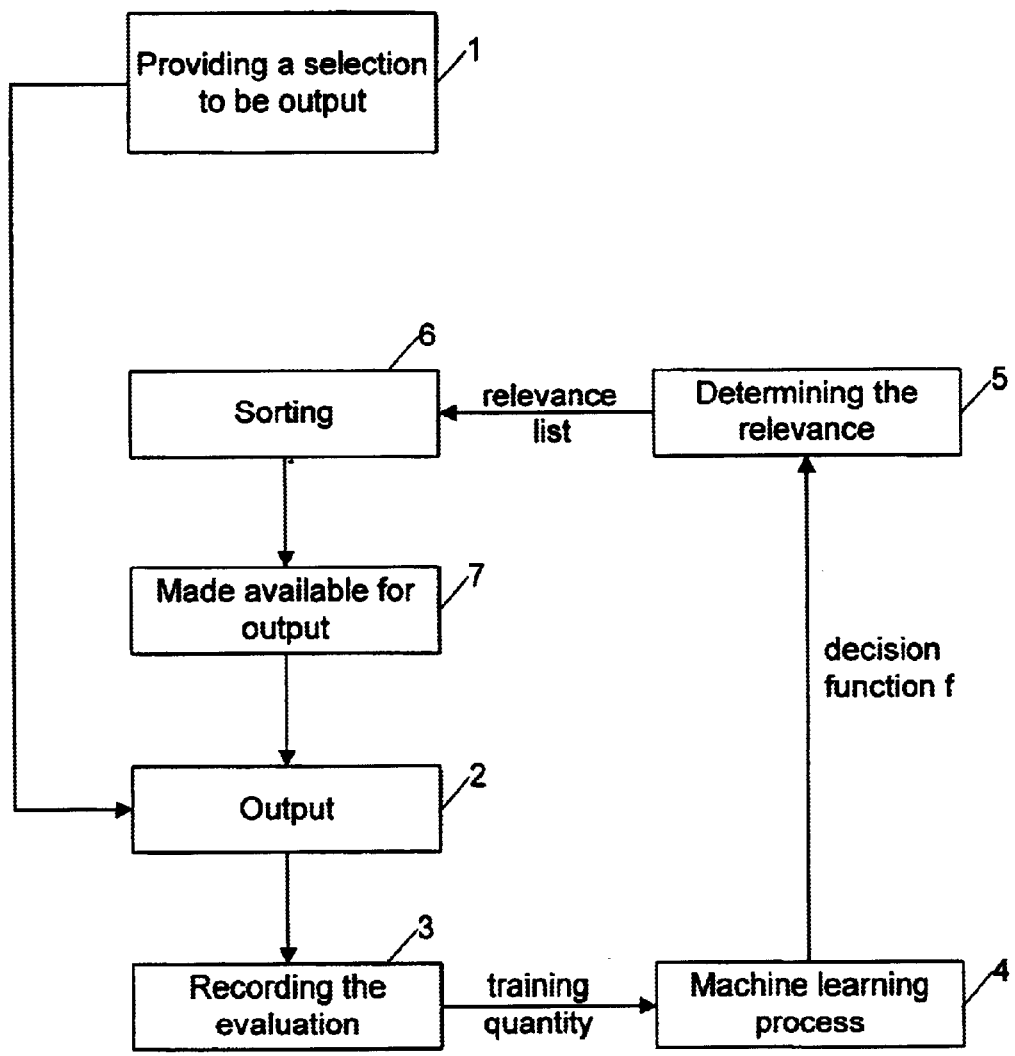
FIG. 1 is a diagrammatic presentation in the form of a block diagram for describing a method of automatically searching for relevant picture data sets.

To begin with, as illustrated in FIG. 1, a first selection of pictures, i.e., their associated picture data sets are provided (1) to be output by a display device which is connected to a computer. The computer in turn is connected to the data base in which the quantity D of picture data sets are stored electronically. The first selection may be generated by device of a catchword list. Other search methods may be applied as well. If the catchword search is chosen it is assured that the method described below fulfills functional requirements of known catchword search systems, i.e., that it can cooperate or be used in combination with such systems.

Next, at least some of the pictures of the first selection are output with the aid of the display device (2) (cf. FIG. 1). By actuating a selection module provided on the computer, the user may enter a respective (binary) evaluation $b_i \in \{-1, +1\}$ at least for some of the search results (pictures or picture data sets output), −1 meaning that the corresponding picture has nothing to do with the relevant subset $D_{rel}$ of pictures looked for, whereas +1 expresses a certain "nearness" or coincidence of the respective picture and the relevant ones $D_{rel}$. It is not necessary to evaluate all the pictures presented or displayed. The user may perform his evaluation, for instance, by a simple mouse click which is recorded electronically by the computer (3) (cf. FIG. 1) and associated electronically with the respective picture. Any selection module provided on the computer may be used, provided they are adapted to record the actuation in such a manner that the recorded actuation subsequently can be associated with the respective picture. The keyboard of a computer, for example, presents such suitable selection module.

A substantial advantage of the method according to the invention becomes evident in this context: The evaluation can be accomplished in very little time, such as less than a second. By contrast, evaluating a text as required with conventional catchword search machines usually takes several minutes. It is realistic to assume that a user, normally, will not evaluate more than a hundred pictures.

The pictures or picture data sets which have been evaluated—typically only a very small part of the whole amount D available to be searched—constitute a training quantity for a subsequent machine learning process (4) (cf. FIG. 1) which is effected automatically by device of the computer. It is the aim of the machine learning process to learn a real-value decision function $f: D \rightarrow \Re$ which offers the best possible replication of the pictures made available directly or evaluated by the user (training quantity). Among the methods suitable to achieve that aim there is the perceptron learning already known as such (M. Rosenblatt, 'Principles of neurodynamics: Perceptron and Theory of Brain Mechanism', Spartan-Books, Washington, D.C., 1962) or the so-called "Support Vector Machine" (C. Cortes and V. Vapnik, 'Support Vector Networks' in Machine Learning, 20:273–297, 1995). When the machine learning process is carried out automatically and electronically convenient use is made of the fact that, in contrast to classical problems involved in machine learning, it is not significant that a prediction error (of the relevance) be very small for those pictures of the quantity D which are not utilized for the machine learning process. It suffices for implementing the method in practice that at least one picture is found of the subset of relevant pictures $D_{rel}$, The decision function f determined in the context of the machine learning process subsequently serves to allocate a new relevance (5) (cf. FIG. 1) to the pictures of quantity D, which relevance matches the individual evaluation given the pictures by the user. Thereafter, the pictures are sorted according to the new relevance (6) and offered or made available (7) (cf. FIG. 1) to be output by the display device. In calculating the new relevance it may be advantageous to include only part (>10,000) of the total quantity D of pictures in the calculation of the new relevance if the number of pictures in quantity D is extremely high (>10,000,000 for example). Not only will the calculation expenditure thus be reduced but also the time period required will be shorter. A convenient calculation of the new relevance based on the decision function first is made at least for those pictures which are included in the first selection (1) (cf. FIG. 1).

The course of events described above and illustrated diagrammatically in FIG. 1 may be repeated until the user has found one or more relevant pictures or wishes to start an entirely new search query, in other words until $D_{rel}$ changes.

The machine learning process is a core component of the method described because for the first time methods of classification learning are combined here, in a so-called information retrieval system, with the search for pictures in electronic data bases. Machine learning is a process which (learns to) select(s) a decision function f from among a given quantity of decision functions, based on the training quantity. It is the aim of this selection to find the very decision function f* which entails the least number of erroneous decisions (regarding relevance) on pictures not yet seen of the quantity D of pictures or picture data sets. The pictures not yet seen comprise those pictures of quantity D which the display device did not yet display to the user to make his evaluation. The difference between the error generated by the function f learned and the best function f on the pictures not yet seen is referred to as generalization error. Basically, learning processes may be judged by two criteria:

i) how small on average is the generalization error, i.e., averaged across frequent learning?

ii) how costly is the learning process in response to the number of training examples comprised by the training quantity?

Although it is important for many applications that both the generalization error and the calculation expenditure be small—an object which often cannot be met—the significance of the expenditure of the learning algorithm is of secondary nature for the search method described here because, normally, a maximum of 100 pictures evaluated by the user are made available within the training quantity. Many times the user of the picture search system is content with the presentation of just one relevant picture among the first thirty pictures shown.

In principle, any machine learning process is applicable in combination with the novel search method described, provided it has vectors x (picture descriptions, such as catchword vectors) as inputs and provides real numbers (the system relevances calculated) as outputs. Yet it is advantageous if the learning process explicitly tries to find decision functions with which the relevance on pictures not yet seen can be calculated very quickly. At present, generalized linear functions are preferred:

$$f(x) = \sum_{i=1}^{N} w_i \phi_i(x) \quad (1)$$

wherein the functions $\phi_i: D \rightarrow \Re$ are designated as basic functions; $w_1 \ldots w_N$ are the quantities to be determined by the learning process. It can be demonstrated that the following formulation may be started from for a very big class of learning methods:

$$w_i = \sum_{j=1}^{t} \alpha_j \phi_i(x_j) \quad (2)$$

wherein $x_1, \ldots, x_t$ ($t \leq n$) are to be the pictures (picture descriptions) evaluated by the user. The advantage of proceeding according to that formulation becomes apparent if one inserts equation (2) in equation (1):

$$f(x) = \sum_{i=1}^{N} \left( \sum_{j=1}^{t} \alpha_j \phi_i(x_j) \right) \phi_i(x) \quad (3)$$

$$= \sum_{j=1}^{t} \alpha_j \underbrace{\left( \sum_{i=1}^{N} \phi_i(x_j) \phi_i(x) \right)}_{K(x_j, x)} \quad (4)$$

Instead of having to learn N parameters $w_1 \ldots w_N$ which often may lead to difficulties, such as the training quantity becoming "overfitted", no more than t<100 parameters $\alpha_1 \ldots \alpha_t$ must be learned. Especially when it is question of searching for a picture, the number N of catchwords is much greater than the number of pictures evaluated t. Another consequence is that it is sufficient to specify function K, referred to as the core (cf. G. Wahba, 'Spline Models for Observational Data', Society for Industrial and Applied Mathematics, Philadelphia, 1990). At present, the core below is preferred for application in practice:

$$K(x, x') = \left( \sum_{i=1}^{S} x_i \cdot x'_i + c \right)^p, c \in \Re^+, p \in \{1, 2, \ldots\} \quad (5)$$

This core has the following advantage: If p=2 it device that basic functions i are used of which the configuration is $x_i \cdot x_j$, i.e., which correspond to a logical operation by device of conjunction (AND) of the ith and jth catchwords for picture description vectors $x \in \{0, 1\}^s$. For greater values of p this corresponds, for example, to features like "ith, jth, and kth catchwords appeared simultaneously". Putting it more generally, this device that correlations between catchwords are recorded up to the pth order. Figure c controls the a priori weighting of catchword combinations.

Based on the description given above of decision functions, the following learning processes may be applied: (a) "Support Vector Machine" (cf., for instance, C. Cortes and V. Vapnik, 'Support Vector Networks' in Machine Learning, 20:273–297, 1995)—(b) "Bayes Point Machine" (cf., for instance, R. Herbrich et al. 'Bayes point machines: Bayes point in kernel space', Proceedings of the IJCAI Workshop Support Vector Machines, 1999)—(c) "Linear Programming Machine" (cf., for instance, T. Graepel et al., 'Classification of proximity data with LP-machines', Proceedings of the 9th International Conference on Artificial Neuronal Networks, 1999)—or (d) the known perceptron (cf., for instance, M. Rosenblatt, 'Principles of neurodynamics: Perceptron and Theory of Brain Mechanism', Spartan-Books, Washington, D.C., 1962). The perceptron learning process is the preferred one at the present time because it can be shown that, with the least expenditure, this learning process is sure to provide solutions $\alpha=(\alpha_1, \ldots, \alpha_t)$ with which only a few coefficients $\alpha_i$ differ from zero. This is a circumstance which greatly expedites the calculation of new system relevances by device of the decision function f which has been learned. Moreover, the original algorithm was broadened by automatic adaptation of the so-called Ridge term. This device that the core function will be changed as follows if the learning process has not been completed after a number of, e.g. ten, iterations through the entire training quantity:

$$K(x, x') = \begin{cases} K(x, x') & \text{wenn } x \neq x' \\ K(x, x') + \lambda & \text{wenn } x = x' \end{cases}$$

The parameter $\lambda$ is increased gradually, and it can be shown that this must lead to the termination of the algorithm or process.

Figure 2:
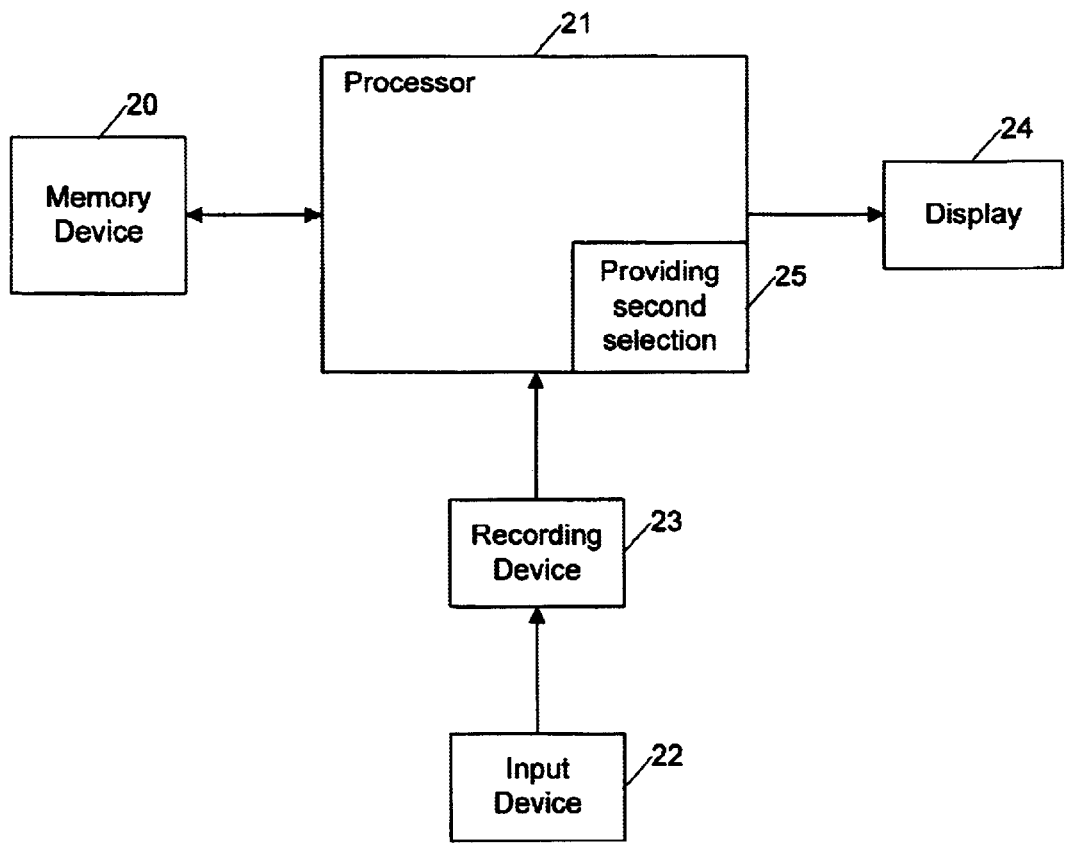
FIG. 2 is a diagrammatic presentation of an apparatus for performing the new method of automatically searching for relevant picture data sets.

FIG. 2 shows a diagrammatic presentation of a search apparatus for performing the method described. Picture data sets are stored in a memory device 20 which can be accessed by a processor 21. For recording a selection made by a user by device of a input device 22, such as a keyboard or a mouse device, a recording device 23 is connected to the processor 21 and the input device 22. Results of the processing in the processor 21 can be displayed by a display device 24, such as a monitor. In the method described above, after carrying out the machine learning process to determine a decision function f and determining a respective system relevance for picture data sets, a second selection of the picture data sets is provided by device 25.

The method described of automatically searching for relevant picture data sets may be installed and carried out, with the assistance of a computer program, on a digital computer, for example a personal computer, a network computer, or a server device. The instant patent application also relates to a computer program product adapted to be loaded into a memory device of a digital computer. This computer program product comprises software code sections for carrying out especially the method steps defined in any one of the method claims if the computer program product is used in the digital computer.

The features of the invention disclosed in the above specification, in the claims and drawing may be significant, both individually and in any desired combination, for realizing the invention in its various embodiments.

What is claimed is:

1. A method of automatically searching for relevant picture data sets in a quantity of n (n≧2) picture data sets electronically stored in a memory device, picture attributes for each of the n picture data sets being stored electronically in the memory device, and the n picture data sets as well as the stored picture attributes being adapted to be processed electronically by a processor, said method comprising:

(a) providing a first selection of picture data sets from the n picture data sets using the processor to be output by a display device;

(b) outputting several of the picture data sets of the first selection of picture data sets using the display device;

(c) electronically recording a respective evaluation by a user for at least one relevant picture data set of the plurality of picture data sets output according to (b); and (d) providing a second selection of m (m≦n) picture data sets from the n picture data sets in a sequence which depends on a respective system relevance of the m picture data sets to be output by the display device;

a machine learning process being carried out for electronically determining a decision function f to provide the second selection of the m picture data sets; the picture attributes electronically stored in the memory device for the at least one relevant picture data set constituting a training quantity for the machine learning process; the respective system relevance being determined for k (k≧m) picture data sets using the decision function f and the respective electronically stored picture attributes; and the k picture data sets comprising at least part of the m picture data sets of the second selection.

2. The method as claimed in claim 1, wherein the first selection of picture data sets from the n picture data sets is determined by device of a catchword search.

3. The method as claimed in claim 1, wherein the electronic recording of the respective evaluation by the user for the at least one relevant picture data set according to (c) comprises recording an actuation of an electronic selector device.

4. The method as claimed in claim 3, wherein the selector device is a mouse device configured to cooperate with the display device.

5. The method as claimed in claim 1, wherein the respective evaluation of the user for the at least one relevant picture data set according to (c) is recorded electronically as a binary evaluation so that each picture data set evaluated is adapted to be recorded as a relevant picture data set and each picture data set not evaluated is adapted to be recorded as a non-relevant picture data set.

6. The method as claimed in claim 1, wherein the decision function f is determined in the context of the machine learning process so that the electronic determination of the respective system relevance is optimized as regards the time period it requires.

7. The method as claimed in claim 1, wherein the machine learning process is carried out as a perceptron learning process.

8. The method as claimed in claim 1, wherein the picture attributes stored comprise catchwords suitable for electronic evaluation by the processor.

9. A picture search apparatus, comprising:

a memory device configured to electronically store n (n≧2) picture data sets and respective picture attributes each associated respectively with the n picture data sets;

a display device configured to output a first selection of picture data sets from the n picture data sets;

a recording device configured to electronically record a respective evaluation by a user for at least one relevant picture data set of the first selection of picture data sets output;

a processor configured to automatically carry out a machine learning process to determine a decision function f in consideration of the picture attributes stored electronically in the memory device for the at least one relevant picture data set, and to electronically determine a respective system relevance for m (m≦n) picture data sets of the n picture data sets stored electronically in the memory device with the aid of the decision function f and the respective electronically stored picture attributes; and a device for providing a second selection of picture data sets in a sequence which depends on the respective system relevance to be output by the output by the display device, the second selection of picture data sets comprising k (k≧m) picture data sets of the m picture data sets.

10. The picture search apparatus as claimed in claim 9, further comprising a search module configured to carry out a catchword search to search for the first selection of picture data sets.

11. A computer readable program product comprising computer program code for automatically searching for relevant picture data sets in a quantity of n (n≧2) picture data sets electronically stored in a memory device, picture attributes for each of the n picture data sets being stored electronically in the memory device, and the n picture data sets as well as the stored picture attributes being adapted to be processed electronically by a processor, said computer program code providing for execution of a method comprising:

(a) providing a first selection of picture data sets from the n picture data sets using the processor to be output by a display device;

(b) outputting several of the picture data sets of the first selection of picture data sets using the display device;

(c) electronically recording a respective evaluation by a user for at least one relevant picture data set of the plurality of picture data sets output according to (b); and (d) providing a second selection of m (m≦n) picture data sets from the n picture data sets in a sequence which depends on a respective system relevance of the m picture data sets to be output by the display device;

a machine learning process being carried out for electronically determining a decision function f to provide the second selection of the m picture data sets; the picture attributes electronically stored in the memory device for the at least one relevant picture data set constituting a training quantity for the machine learning process; the respective system relevance being determined for k (k≧m) picture data sets using the decision function f and the respective electronically stored picture attributes; and the k picture data sets comprising at least part of the m picture data sets of the second selection.

* * * * *